F. HUMPHRIS.
SPRING LOCKING WASHER.
APPLICATION FILED JUNE 21, 1919.

1,323,188.

Patented Nov. 25, 1919.

Witnesses

Inventor
Frank Humphris
by
Attorney

UNITED STATES PATENT OFFICE.

FRANK HUMPHRIS, OF BOSCOMBE, ENGLAND.

SPRING LOCKING-WASHER.

1,323,188.    Specification of Letters Patent.    Patented Nov. 25, 1919.

Application filed June 21, 1919. Serial No. 305,887.

*To all whom it may concern:*

Be it known that I, FRANK HUMPHRIS, a subject of the King of Great Britain, and resident of Boscombe, England, have invented a new or Improved Spring Locking-Washer, of which the following is a specification.

The present invention relates to means for counteracting the loosening tendency of bolts, nuts, screws, studs and the like when fitted on or in machinery or the like subject to vibration and the object of the said invention is to provide a device for the purpose which shall be highly efficient without injury or material injury to the devices with which it is used, economical to manufacture and easy to use.

According to the said invention an annular piece or washer is provided with a number of resilient projections provided with sharp teeth which when moved in their cutting direction may dig into or jag the faces of the two members they engage for the purpose of preventing movement of one member relatively to the other in the direction not desired. The said washer may be made from sheet metal or other suitable material which has the properties of spring steel particularly in regard to hardness and resilience and the said washer may be perforated or cut in such a manner that the result of this operation provides a number of sharp resilient projections provided with teeth on opposite sides or faces of the washer the said projections with teeth, during the perforation or cutting of the washer, being so bent or curved that they will act in a ratchet-like manner on the devices to be locked by them. To enable this to be performed the said resilient projections with teeth are provided with sharpened, spiked, pointed, or serrated edges at their extremities, which formation enables and allows them to dig into anything they are pressing upon when the device is moved or partially rotated in one direction, but allows them to slide thereon when said device is moved in the reverse direction.

The resilient projections, or blades with teeth may be tongue-shaped in form and their sharpened edges are provided for the purpose of engaging with the usual faces on bolts, studs, screws, nuts, or the like or with the threads, bodies, or stem thereof, as well as with any other material, part, or parts, against which the said sharpened projections with teeth or the like impinge, upon or in that part which receives the bolt, nut, or the like on or in connection with which the said washer is used.

A progressively greater number of resilient projections provided with sharpened teeth may be, or preferably will be employed on the annular washer described herein as its diameter increases, (and this without necessitating any increase in the gage or thickness of the sheet or flat material from which said washer may be made) for the reasons that each resilient projection is a separate spring and jagging device in itself, and when multiplied very great resilient and gripping qualities are exerted, especially in the case of washers having large diameters.

The absence of any necessity to use other than a comparatively thin gage of material for producing washers of the kind embodying the features of this invention, makes it possible to employ them on bolts, nuts, studs, screwed flange faces, or the like which ordinarily (and without replacement by longer ones) have not enough length to spare for allowing the thicker known methods of lock-washers to be successfuly employed.

In order that the said invention may be clearly understood and readily carried into effect it is hereinafter described with reference to the accompanying drawings which illustrate several embodiments of the said invention by way of example.

Figure 1 is a face view of a washer which is provided at and for a distance from its larger diameter with resilient projections having jagging teeth at their extremities.

Fig. 1$^a$ is an edge view of the washer shown by Fig. 1.

Fig. 2 is a face view of a washer which is provided at and for a distance from its larger diameter and at and for a distance from its smaller diameter with resilient projections having jagging teeth at their extremities.

Fig. 2$^a$ is an edge view of the washer shown by Fig. 2.

Fig. 3 is a face view of a washer which is provided, at approximately midway between its larger and smaller diameters with resilient projections having jagging teeth at their extremities.

Fig. 3$^a$ is an edge view of the washer shown by Fig. 3.

Figure 1:
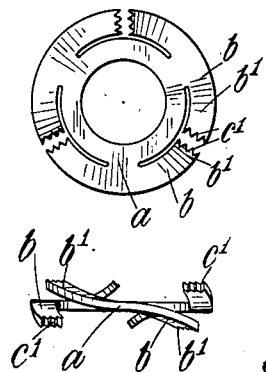
Figure 2:
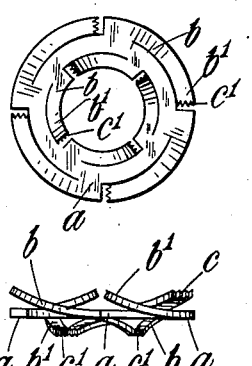
Figure 3:
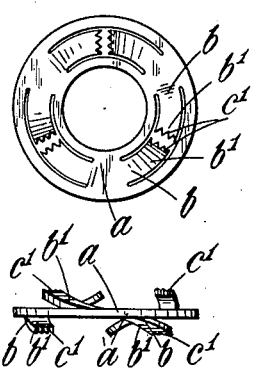
Figure 4:
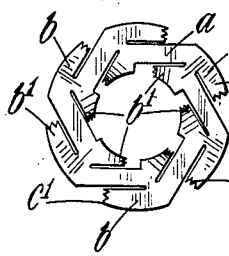
Fig. 4 is a face view of a washer which is split or pierced so as to provide it at and for a distance from its larger diameter and at and for a distance from its smaller diameter with resilient projections which taper toward their jagging toothed extremities.
Figure 7:
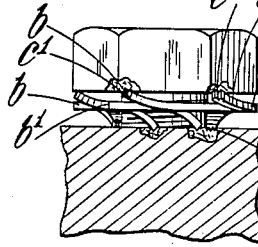

Fig. 7 is a side view partly in section of a bolt inserted in a section of material comprising in edge view and before compression, the washer shown in Fig. 4, which, to make its functions clear, is illustrated with exaggerated jags in the bolt-head and in the material, so as to show the tendency of the toothed extremities of the resilient projections when the bolt-head is turned in the direction of approach to the toothed extremities, and the washer is under compression.

Figure 5:
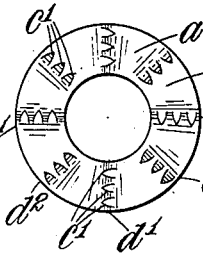
Fig. 5 is a face view of a washer which is waved, crimped, or corrugated and also provided with sharpened teeth which project or emanate from, or near to, the crown of each ridge thereof when viewed from both faces of the washer.
Figure 8:
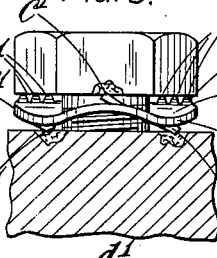

Fig. 8 is a similar view to Fig. 7 and is given for a similar purpose but in this case it comprises the waved or corrugated washer shown in Fig. 5.

Figure 6:
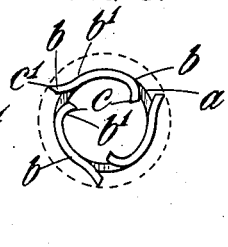
Fig. 6 is a face view of a tubiform annular washer which is split or pierced so as to provide it, on one or both sides thereof, with resilient projections having teeth at their sharpened edges.
Figure 9:
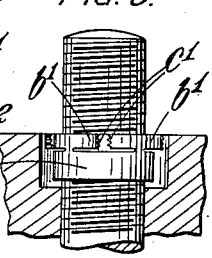

Fig. 9 is a side view partly in section of a stud inserted in a prepared recess in the material as shown in section, on which stud is placed the tubiform washer of the kind shown in Fig. 6.

Figure 10:
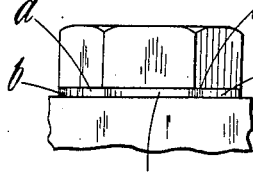

Fig. 10 shows in edge view the washer shown in Figs. 4 and 7, as it appears when fully compressed between a bolt-head, nut, or set-screw and the material it is in engagement with.

Figure 11:
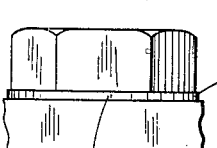

Fig. 11 shows in edge view the washer shown in Figs. 5 and 8, as it appears when fully compressed between a bolt-head, nut, or set-screw and the material it is in engagement with.

Figure 12:

Fig. 12 is a part side view of the stud and material shown in Fig. 9, the washer in this case being not visible as it is in the recess provided in the material.

In the following description the parts of the said figures are referred to by the letters and numerals marked thereon the same letters and numerals indicating the same or equivalent parts in all the figures.

One of the features of the present invention is to provide a complete annular spring-washer $a$ (in distinction to a split washer) so formed in its outcutting as to give as a result thereof a multiplicity of springs $b$, each spring or tongue $b$ having independent action, and upon all the said springs or tongues $b$ there are provided sharpened spikes or teeth $c'$ or the like that can and will jag in one direction or in other words, engage with any surface they are moved forwardly against so that when the multi-spring-washer $a$ described herein is employed for fastening bolts, nuts, or the like, the sharpened teeth $c'$ of the springs $b$ jag into and give absolute security against such becoming loose. This result is also obtained in cases where bolts, nuts, or the like are holding together non-machined parts on which it will be obvious that only non-parallel faces exist. Some of the teeth $c'$ of the projections $b$ of each set which are on the opposite faces of the multi-spring-washer $a$, by virtue of the resilient properties of the tongues $b$ and to their keen extremities $c'$, will effectually secure the bolt or nut or the like against the slightest partial rotation in that direction that would allow them to become loose.

The said annular multi-spring-washer $a$ may be perforated, pierced, or pressed out so as to have various forms, each one however is provided for and with the same object, i. e.:—to provide resilient projections $b$ with teeth $c'$ which emanate from one or both faces of lock-washers, having the jagging qualities hereinbefore mentioned, which projections $b$ or teeth $c$ are set in an oblique or curvilinear manner $b'$ to the surface of the blank, washer, or ring $a$ from which they are formed or pressed, so as to serve the purpose stated.

In addition to pressing out the said tongues $b$ or teeth $c'$ from a blank or washer $a$, the said washer $a$ may also be waved, crimped, or corrugated $d$ in such a manner that it presents ridges $d'$ and hollows $d^2$ on each face thereof, (see Figs. 5 and 8) and at the top of said ridges $d'$ pressed or formed therethrough from the bottom of each hollow $d^2$ on the opposite face, sharp teeth $c'$ are formed for the purpose of engaging in a like manner and for the same purpose as the teeth $c'$ on the resilient tongues or engaging projections $b$, which are provided on the washers not having waved or corrugated faces also. A further spring action in this waved form $d$ of washer $a$ would be derived from its tendency to maintain its ridge $d'$ and hollow $d^2$ contour against the flattening effect exercised by the flat faces it engages of the bolt, nut, or the like, when being screwed up and the said corrugated washer $d$ is interposed beneath the head of the bolt or the like, see Figs. 5, 8 and 11 of the drawings.

The said multi-spring-washer $a$ may also be made and provided in the form of a sleeve, or collar-ring (see Figs. 6, 9 and 12) so cut that one set or series of resilient projections $b$ with teeth $c'$ on its inner face engages with the body or stem of a bolt, stud, screw, or the like, while the other set or series with teeth $c'$ of resilient projections $b$ on its outer face engages with the wall of the recess or hole into which any of the said screwed devices are fitted. This tubiform kind of washer secures the devices it is placed into contact with by virtue of its springing qualities alone and is not aided by any compression value given by the screwed member around which it is placed.

In any one or each one of the examples hereinbefore described it is an essential condition of the construction that a complete and undivided annular piece or circular ring $a$ is formed, as upon or from this is provided, preferably as an integral part thereof, one of the ends or the base of each resilient locking projection $b$ or tooth $c'$ the said ends of course being those remote from the acting ones.

In view of the fact that the teeth $c'$ of the sharpened projections $b$ hold and jag only as the result of their independent spring value (and not as the result of being crushed into threads of the male or female screwed members, or crushed into the faces of bolts, nuts, or the like) no damage is thereby caused to the pieces they secure in a manner usual or imperative with ordinary forms of split washers, or washers with spiked devices specially designed for crushing the threads and faces of bolts, nuts, screws, or the like.

By providing a washer with a multiplicity of engaging jags each one integral with and controlled by the independent spring on which it is formed, the multi-spring-washer according to this invention is enabled to hold with a much less pressure per jag unit than is the case where one jag only is employed to engage with each locking face. Where the multi-spring-washer is employed as a lock-washer irregularities in the parallelism of faces to be engaged are immaterial, which irregularities, when known forms of lock-washers are employed are liable to render such washers inoperative.

It is of course obvious and it is intended that the multi-spring-washer will be made with its sharpened resilient projections having teeth so far as each face is concerned, pointing in one direction to operate correctly with right-hand threaded devices and in the opposite direction to operate correctly with left-hand threaded devices. It is also obvious that the multi-spring-washer may be made with its sharpened resilient projections having teeth so far as each face is concerned, pointing in both directions, this form of construction being very convenient for use in cases where a spanner cannot be applied for holding bolt-heads, studs or the like as it prevents the member it is holding from turning in either direction.

What I claim is:—

An annular washer of the class specified comprising a washer body, a series of integral resilient tongues formed from said washer body in the peripheral margin thereof, an inner series of resilient tongues concentrically disposed relative to said peripheral series, said washer body presenting between said series of tongues a continuous annular rib, the biting edges of the tongues constituting said inner series and the biting edges of the tongues constituting said peripheral series being disposed in staggered arrangement, said tongues of the peripheral series projecting in an opposite direction from the face of the washer body relative to the tongues of the inner series.

FRANK HUMPHRIS.

Witness:
ERNST LAPPERT.